United States Patent [19]

Sato

[11] Patent Number: 5,064,138
[45] Date of Patent: Nov. 12, 1991

[54] FISHING REEL HAVING IMPROVED COVER AND SEAL STRUCTURE FOR A DRAG MECHANISM

[75] Inventor: Jun Sato, Sakai, Japan

[73] Assignee: Shimano Industrial Company, Limited, Osaka, Japan

[21] Appl. No.: 581,133

[22] Filed: Sep. 10, 1990

Related U.S. Application Data

[60] Continuation of Ser. No. 351,595, May 15, 1989, abandoned, which is a division of Ser. No. 126,353, Nov. 30, 1987, Pat. No. 4,852,826.

[30] Foreign Application Priority Data

Dec. 28, 1986 [JP] Japan .............................. 61-315240
Dec. 28, 1986 [JP] Japan .............................. 61-315241

[51] Int. Cl.$^5$ ......................................... A01K 89/015
[52] U.S. Cl. ................................... 242/268; 242/319
[58] Field of Search ............... 242/260, 261, 268, 269, 242/270, 302, 303, 319

[56] References Cited

U.S. PATENT DOCUMENTS

| | | | |
|---|---|---|---|
| 2,255,703 | 9/1941 | Grieten | 242/270 |
| 2,593,872 | 4/1952 | Gohde | 242/269 X |
| 3,027,114 | 3/1962 | Grieten | 242/269 X |
| 3,184,179 | 5/1965 | Wood, Jr. | 242/256 |
| 3,425,644 | 2/1969 | Griste | 242/270 |
| 3,478,979 | 11/1969 | Henze | 242/270 |
| 4,006,867 | 2/1977 | Miyamae | 242/250 |
| 4,394,991 | 7/1983 | Noda | 242/321 |
| 4,546,937 | 10/1985 | Hideo | 242/271 |
| 4,634,079 | 1/1987 | Furomoto | 242/249 |
| 4,651,949 | 3/1987 | Sato | 242/271 |
| 4,681,276 | 7/1987 | Sato | 242/249 |
| 4,742,974 | 5/1988 | Furomoto | 242/271 |
| 4,770,364 | 9/1988 | Sato | 242/270 |
| 4,813,629 | 3/1989 | Hashimoto et al. | 242/319 X |

FOREIGN PATENT DOCUMENTS 57-47176 3/1982 Japan .
61-80669 5/1986 Japan .

Primary Examiner—Joseph J. Hail, III
Attorney, Agent, or Firm—Dickstein, Shapiro & Morin

[57] ABSTRACT

A fishing reel supporting a spool rotatably to a reel body through a spool shaft, which is provided with a drive mechanism for driving the spool, a drag mechanism comprising a braking member and a drag disc and transmitting a driving force from the drive mechanism to the spool, a covering mechanism which has a cover provided with an inner space in which the drag mechanism is housed and has a seal for sealing the inner space at the cover, and a clutch interposed in a driving force transmitting route form the drive mechanism to the spool and allowing the spool to freely rotate, so that the drag mechanism is reliably protected from water and, when the drag mechanism is not operated, the spool is allowed to smoothly freely rotate.

3 Claims, 3 Drawing Sheets

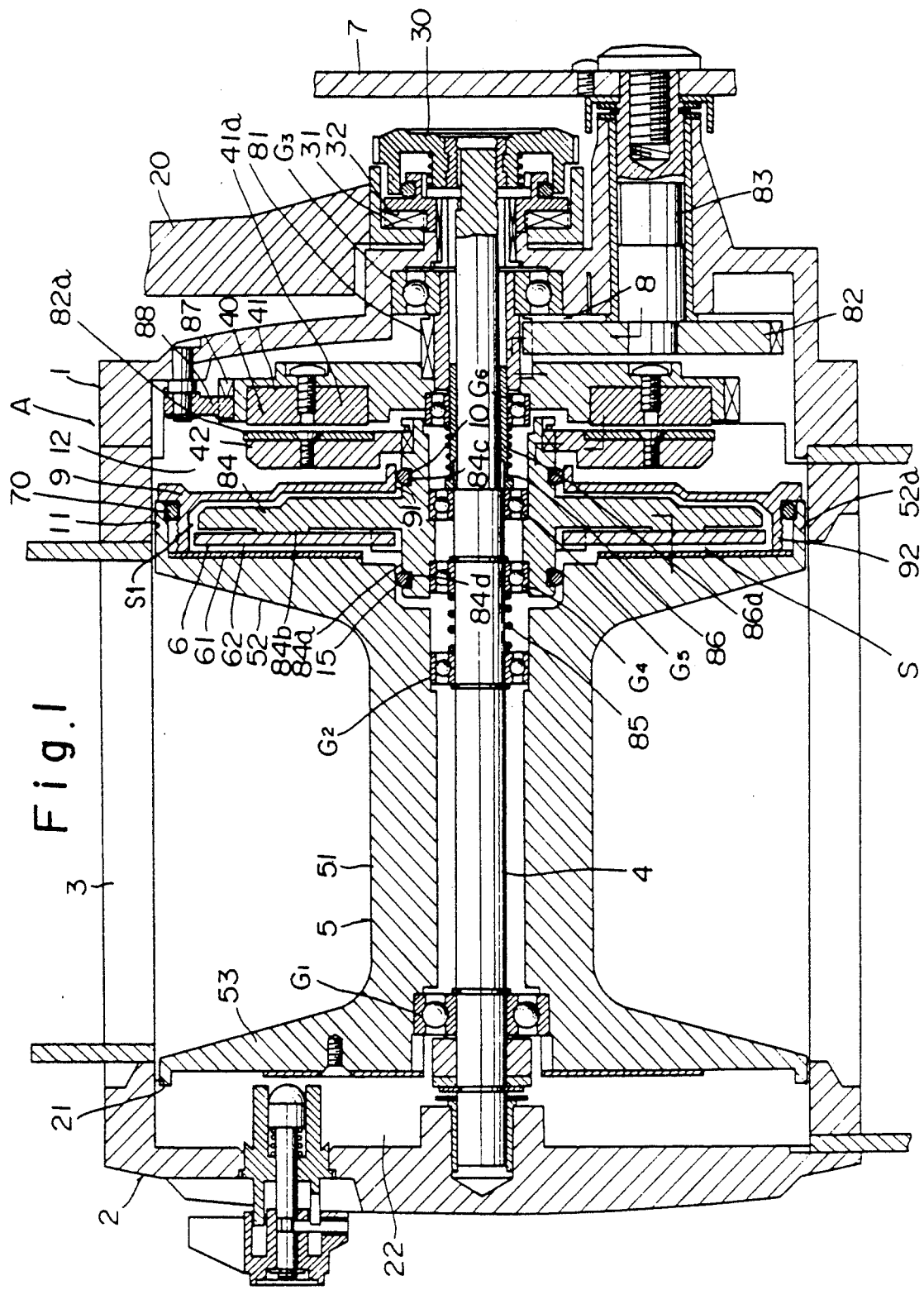

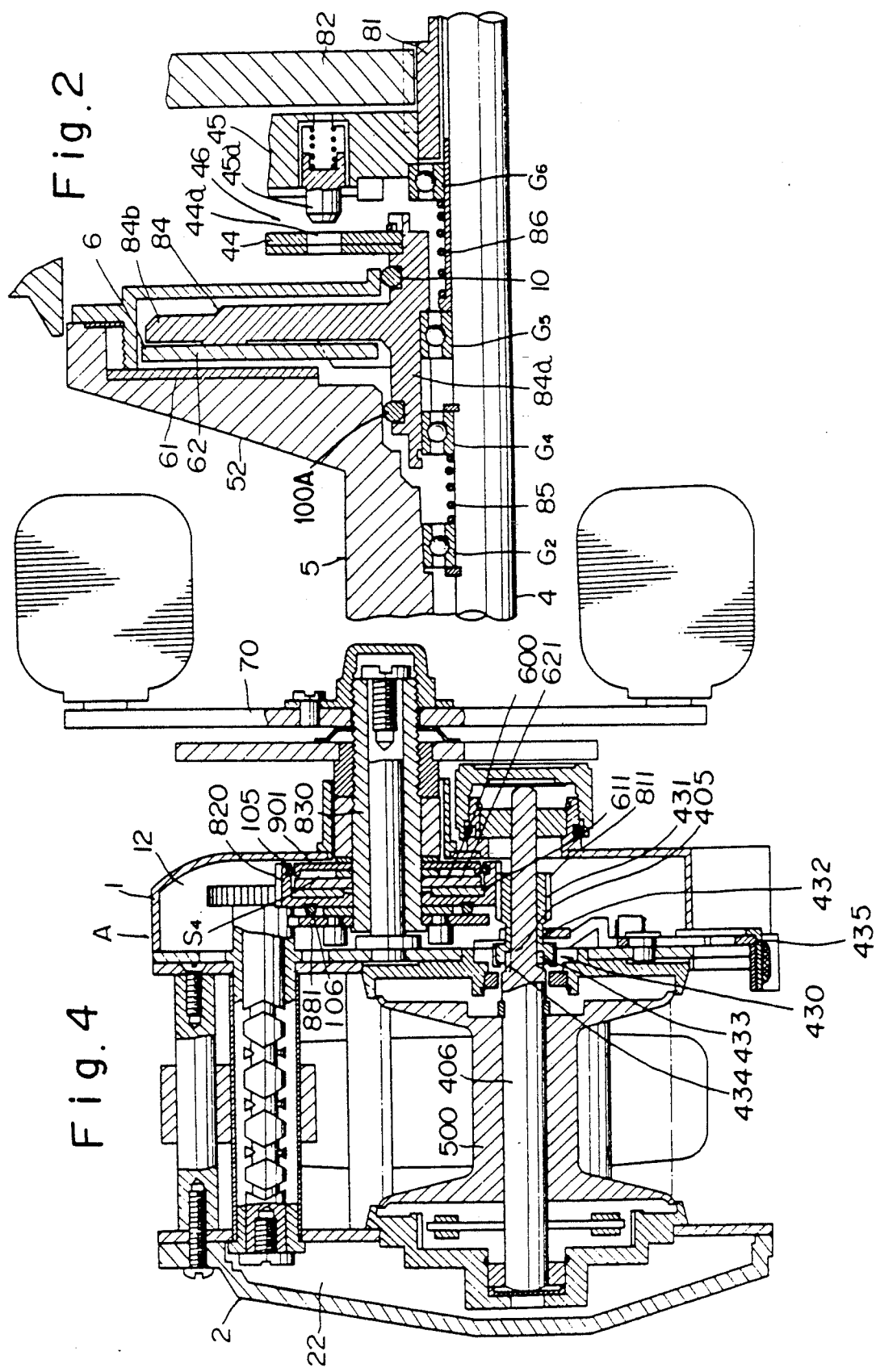

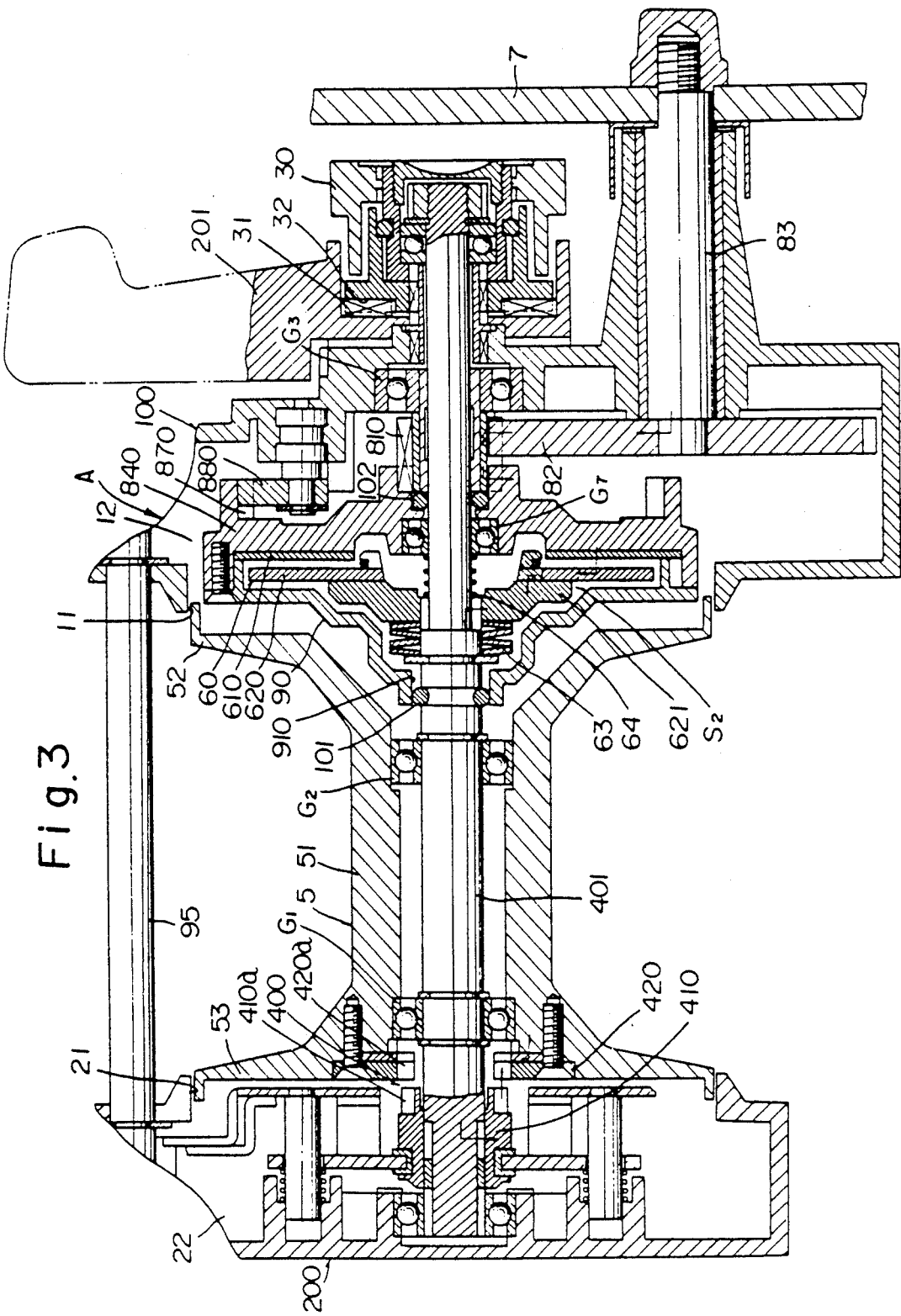

FISHING REEL HAVING IMPROVED COVER AND SEAL STRUCTURE FOR A DRAG MECHANISM

This application is a continuation of application Ser. No. 351,595 now abandoned, filed May 15, 1989 and which is a division of application Ser. No. 126,353 filed Nov. 30, 1987 now U.S. Pat. No. 4,852,826.

FIELD OF THE INVENTION

The present invention relates to a fishing reel, and more particularly, to a fishing reel of the type in which a spool for winding thereon a fishing line is rotatably supported relative to a reel body.

BACKGROUND OF THE INVENTION

A conventional double bearing fishing reel is disclosed in Japanese Utility Model Laid-Open Gazette No. Sho 61-80,669, and is provided at a pair of side frames of a reel body with inner chambers, wherein the inner chamber at one side frame houses a drag mechanism having a braking member formed of asbestos or the like and a drag disc positioned opposite thereto. Such reel includes a drive mechanism for driving the spool and a cover which covers the braking member and drag disc. The cover has a through-bore into which a spool shaft is inserted, thereby preventing the braking member from getting wet due to water entering into the inner chamber at the side frame along the outer periphery of a flange at the spool.

Such conventional fishing reel has between the inner periphery of a through-bore at the cover and the outer periphery of a member at the spool shaft side an annular gap allowing the member at the spool shaft side to rotate. This creates a problem in that water entering into the inner chamber at the side frame enters into the cover through the gap to attach to the braking member or the drag disc, with resulting deterioration of the braking effect or variation in the frictional resistance at a water content portion of the braking member with respect to frictional resistance at a non-water-content portion of the same. This results in variation in the braking effect during a single revolution of the spool so that, when a fishing line is drawn out by a force larger than the braking effect, the tip of a fishing rod undergoes a vertical pulsating motion.

SUMMARY OF THE INVENTION

An object of the present invention is to provide a fishing reel with a space containing therein the drag mechanism sealed so as to reliably protect the drag mechanism from water and which can provide for smooth and free rotation of the spool when the drag mechanism is not actuated.

The present invention has been designed to attain the above purpose and is characterized by providing a spool shaft supported rotatably to a reel body, a spool having a pair of flanges and supported rotatably to the spool shaft, a drive mechanism for driving the spool, a drag mechanism having a braking member and a drag disc for transmitting a driving force of the drive mechanism to the spool, a covering mechanism which has a cover defining an inner space in which the braking member and the drag disc are housed and covered and which has sealing means for sealing the inner space, and a clutch means which is interposed in a route or drive train assembly for transmitting the driving force from the drive mechanism to the spool for allowing the spool to freely rotate when the clutch is disengaged.

Since the sealing means thus seals the aforesaid inner space at the cover, there is no risk that water or the like will enter the inner space. Accordingly, the drag mechanism can always be stably operated, and moreover, when the drag mechanism is not actuated, the spool is freely rotatable through the clutch means without being affected by the sealing means.

The above and further objects and novel features of the invention will be more fully apparent from the following detailed description when the same is read in connection with the accompanying drawings.

BRIEF DESCRIPTION OF THE DRAWINGS

FIG. 1 is a sectional view of a first embodiment of a fishing reel of the invention, FIG. 2 is a sectional view of a principal portion of a second embodiment of the invention, FIG. 3 is a partial sectional view of a third embodiment of the invention, and FIG. 4 is a sectional view of a fourth embodiment of the invention.

DETAILED DESCRIPTION OF THE PREFERRED EMBODIMENTS

Referring now to the drawings, a double bearing fishing reel is shown which includes a reel body A basically comprising a pair of first and second side frames 1 and 2 opposite to each other and spaced at a predetermined interval and connectors 3 connecting the side frames 1 and 2; a spool shaft 4 supported axially movably between side frames 1 and 2; a spool 5 comprising a cylindrical trunk 51 and a pair of first and second flanges 52 and 53 projecting radially outwardly from both axial ends of the trunk 51, the spool being supported at an intermediate portion of the spool shaft 4 rotatably through first bearing $G_1$ moving in association with the spool shaft 4 and a second bearing $G_2$ movable relative thereto; and a mounting leg provided at the bottom surface of the reel body A at the mounting side to a fishing rod.

The side frames 1 and 2 have annular portions 11 and 21 disposed opposite to the outer peripheries of the flanges 52 and 53 at the spool 5 with slight gaps therebetween and inner chambers 12 and 22 within the annular portions 11 and 21 respectively, thereby preventing a fishing line from being wound onto the spool 5 from entering into each inner chamber 12 or 22 through a gap between the outer periphery of the first or second flange 52 or 53 and the annular portion 11 or 21.

A driving shaft 83 is supported rotatably to the first side frame 1, and a handle 7 is fixed to one end of the driving shaft 83 projecting outwardly from the first side frame 1. Within the first side frame 1 is provided a driving mechanism 8 comprising a pinion 81 sleeved onto the outer periphery of the spool shaft 4 and supported rotatably with respect to the first side frame 1 and spool shaft 4 through a third bearing $G_3$, and a master gear 82 mounted on the other end of the driving shaft 83 projecting into the first side frame 1 and engageable with the pinion 81.

Within the inner chamber 12 at the first side frame 1 is provided a drag mechanism 6 including a substantially ring-shaped braking member 61 disposed opposite to the side surface of the first flange 52 at the spool 5 and a drag disc 62 positioned opposite to the braking member 61, so that a driving force initiated by rotating the handle 7 is transmitted to the spool 5 through the drag mechanism 6.

The braking member 61 is formed preferably of a thin base plate formed of phenol resin or metal and having heat resistance and flexibility, the base plate being coated at both side surfaces with woven fabrics, such as cotton or linen, of heat resistance. The drag disc 62 is mounted on the side surface of a disc 84b of a transmission member 84 comprising the disc 84b and a cylinder 84a.

In a first embodiment of the invention shown in FIG. 1, the braking member 61 at the drag mechanism 6 is mounted on the outside surface of the first flange 52 at the spool 5, and a fourth bearing $G_4$ and a fifth bearing $G_5$ are provided on spool shaft 4, with fourth-bearing $G_4$ and fifth bearing $G_5$ being axially movable relative to each other. Transmission member 84 carrying the drag disc 62 is mounted on the spool shaft 4 rotatably and axially movably relative thereto through the fourth and fifth bearings $G_4$ and $G_5$.

Spool shaft 4 has one end projecting outwardly from the first side frame 1 so that a mounting member 30 for a drag lever 20 operating to axially move the spool shaft 4 is screwed with the projecting end of spool shaft 4. Between the first side frame 1 and the mounting member 30 are provided a pair of first and second cam bodies 31 and 32, with drag lever 20 being fixed to the first cam body 31.

Thus, the drag lever 20 is turned to axially disengage the second cam body 32 at the mounting member 30 side from the first cam body 31 at the drag lever 20 side so as to move the spool shaft 4 rightwardly in FIG. 1, and the movement of spool shaft 4 is transmitted to the spool 5 through the bearing G1. This moves the spool together with the spool shaft 4 toward the first side frame 1, thereby press-contacting the braking member 61 with the drag disc 62 and giving, by the braking effect caused by this press-contact, a predetermined resistance to free rotation of the spool 5.

Also, a cylindrical portion 52a projects from the outer peripheral portion of the first flange 52 toward the first side frame 1, and a cover 9 is formed which is provided with an inner space S1 which provides a housing for braking member 61 and drag disc 62. Cover 9 has at its center a through bore 91 through which the spool shaft 4 is inserted and at its outer peripheral portion a mounting cylinder 92 screwable with the cylinder 52a at the first flange 52, the mounting cylinder 92 screwing with the cylinder 52a to mount the cover 9 to the outside of the first flange 52.

A sealing means comprising a sealing member 10, such as a rubber O-ring, is interposed between the inner periphery of the through bore 91 and an annular recess 84c formed at the outer periphery of the cylinder 84a at the transmission member 84, thereby sealing the inner space S1 at the cover 9.

The sealing member 10 serves to apply a predetermined resistance to rotation of the cover 9 relative to the transmission member 84. Accordingly, the rotation of the spool 5 when freely rotating is transmitted from the cover 9 to the transmission member 84 through the sealing member 10. As a result, the transmission member 84 freely rotates together with the spool 5.

In addition, it is preferable to provide a sealing member 70, such as an O-ring, between the mounting cylinder 92 and the first flange 52.

A first clutch member 41, which is annular and provided with a friction plate 41a, is supported at the inner periphery of one axial end thereof to one axial end of the pinion 81 to be non-rotatable relative to and non-axially-movable toward the pinion 81. First clutch member 41 is supported at the inner periphery of its other axial end to the spool 4 through a sixth bearing G6. A second clutch member 42, which is also annular and provided with a friction plate 42a, is spline-connected to the cylinder 84a at the transmission member 84. First and second clutch members 41 and 42 constitute a clutch means 40. The clutch means 40 engages to transmit the rotation of pinion 81 to the transmission member 84 and disengages to allow the spool 5 together with the cover 9 and transmission member 84 to freely rotate.

Between the second bearing G2 and the fourth bearing G4 is provided a first return spring 85 for biasing the transmission member 84 so as to disengage from the spool 5 and between the sixth bearing G6 and a sleeve 86a fitted onto the spool shaft 4 is provided a second return spring 86 for biasing through the fifth bearing G5 the transmission member 84 to move away from the first clutch member 41. Second return spring 86 is set to be smaller in spring force than the first return spring 85. Thus, the drag lever 20 is operated to move the spool shaft 4 rightwardly in FIG. 1 so as to actuate the drag mechanism 6 such that the second return spring 86 is deflected in advance of the first return spring 85 to press-contact the second clutch member 42 with the first clutch member 41, thereby engaging the clutch means 40. Thereafter, first return spring 85 is deflected to press-contact the braking member 61 with the drag disc 62, thereby actuating the drag mechanism 6.

In addition, in the first embodiment in FIG. 1, the cylinder 84a at the transmission member 84 has one axial end at the spool side inserted into trunk 51 of spool 5 and an auxiliary sealing member 15, such as a rubber O-ring, is interposed between the inner periphery of the trunk 51 and an annular recess 84d formed at the outer periphery of cylinder 84a, thereby sealing the inner space S1. It should be noted that auxiliary sealing member 15 is preferable but not indispensable.

In an embodiment in which the auxiliary sealing member 15 is provided, the portion of trunk 51 of the spool 5 having cylinder 84a partially inserted therein has an inner diameter equal to the through bore 91 at the cover 9, so that when the spool 5 is axially moved to actuate or release the drag mechanism 6, internal pressure in the inner space S1 at the cover 9 is made constant, thereby preventing water from being sucked into the inner space S1 through the sealing member 10 and auxiliary sealing member 15.

Alternatively, a thin flexible lip, instead of the auxiliary sealing member 15, may be provided integrally to one or both of the spool 5 and transmission member 84.

Also, in FIG. 1, anti-reverse-rotation teeth 87 are provided at the outer periphery of the first clutch member 41 and an anti-reverse-rotation pawl 88 engageable with the anti-reverse rotation teeth 87 is supported to the first side frame 1 to be capable of rising and falling.

Next, explanation will be given of the operation of the fishing reel having the aforesaid construction.

When the fishing line is wound onto the spool 5 in the condition in which drag mechanism 6 is not actuated and the clutch means 40 is disengaged as shown in FIG. 1, the drag lever 20 is operated to move the spool shaft 4 rightwardly in FIG. 1, so that the second return spring 86 at first is deflected to move the spool 5, transmission member 84 and spool shaft 4 rightwardly in FIG. 1, whereby the friction plate 42a at the second clutch member 42 press-contacts with the friction plate 41a at the first clutch member 41 to thereby engage the clutch means 40. Next, the first return spring 85 is deflected to press-contact the braking member 61 held to the spool 5 with the drag disc 62. Therefore, a driving force by operating the handle 7 is transmitted to the spool 5 through the master gear 82, pinion 81, clutch means 40 and drag mechanism 6, thereby forcibly rotating the spool 5.

In a condition in which drag mechanism 6 is actuated and the tension of the fishing line caused by a hooked fish is larger than the braking effect of the drag mechanism 6, a slip is generated between the braking member 61 and the drag disc 62, so that the spool 5 rotates relative to the drag disc 62 and the fishing line is drawn out of the spool 5.

Also, when the fishing line wound on the spool 5 is cast for fishing, when the drag lever 20 is returned to release the second cam body 32 from the first cam body 31, spring reactions of the first and second return springs 85 and 86 move the spool shaft 4, spool 5 and transmission member 84 leftwardly at a predetermined stroke as shown in FIG. 1, whereby the braking member 61 moves away from the drag disc 62 to make the drag mechanism 6 non-operative and the second clutch member 42 disengages from the first clutch member 41 so as to disengage the clutch means 40.

Thus, the disengagement of the clutch means 40 allows the spool 5 together with the cover 9 attached thereto, drag mechanism 6 and transmission member 84, to smoothly and freely rotate without being affected by frictional resistance of the sealing members 10 and 15.

Since the sealing member 10 is provided in the gap between the transmission member 84 and the cover 9 attached to the first flange 52 at the spool 5 to cover the braking member 61 and drag disc 62 and thereby to seal the inner space S1, even when water for rinsing the surface of the fishing reel enters the inner chamber 12 through the outer periphery of the first flange 52 at the spool 5, the sealing member 10 can reliably prevent the water from entering the inner space S1 through the gap.

Accordingly, the drag mechanism 6 within the inner space S1 can reliably be prevented from getting wet.

Alternatively, as shown in a second embodiment in FIG. 2, clutch means 46 may, instead of the clutch means 40, be provided which comprises a second clutch member 44 provided with an engaging bore 44a and a first clutch member 45 provided with an engaging projection 45a engageable with the engaging bore 44a. Thus, the clutch construction is not particularly defined or limited but alternative clutch constructions may be envisioned.

Alternatively, when the drag mechanism 6 is not actuated and the clutch means 40 disengages, the spool 5 only may be freely rotated as shown in FIG. 3.

Referring to Fig. 3, in a third embodiment of the fishing reel of the invention, a spool shaft 401 is supported rotatably-to the reel body A, a transmission member 840 is supported to one axial end of a pinion 810 to be non-rotatable and non-axially-movable relative thereto, i.e., in fixed engagement therewith, a braking member 610 is mounted on one side surface of the transmission member 840, and a drag disc 620 is supported to a spool shaft 401 through a support 621 to be non-rotatable but axially movable relative to the spool shaft 401, so that the rotation of pinion 810 is transmitted to the spool shaft 401 through the transmission member 840 and a drag mechanism 60, thereby rotating the spool shaft 401. Also, a cover 90 is mounted on the outer periphery of the transmission member 840, and sealing means formed of a sealing member 101 is provided in a gap between the inner periphery of a through bore 910 at the cover 90 and the outer periphery of the spool shaft 401, thereby sealing the interior of cover 90 to form a sealed space S2. Clutch means 400 comprising a pair of clutch members 410 and 420 having engaging portions 410a and 420a respectively is provided between the spool shaft 401 and the spool 5, whereby the drag mechanism 60 is not actuated and the clutch means 400 disengages to freely rotate the spool 5 only.

In the third embodiment, the clutch means 400 is operated by a clutch operating mechanism having an operating lever 95 journalled to the side frames 100 and 200 and operating in association with a drag lever 201. The clutch means 400 engages to allow the spool shaft 401 to be rotatable relative to the cover 90.

An auxiliary sealing member 102 is provided between the transmission member 840 and the spool shaft 401 for sealing an inner space S2, the auxiliary seal being preferable but not indispensable. Alternatively, instead of the sealing member 102, for example, a thin flexible lip may integrally be provided at the transmission member 840.

Also, the transmission member 840 is provided at the inner periphery of an annular flange with anti-reverse-rotation teeth 870 engageable with an anti-reverse-rotation pawl 880 supported to the first side frame 100.

In addition, in FIG. 3, a reference numeral 63 designates a drag spring, 64 designates a return spring for the drag disc 620, and G7 designates a bearing through which part of the transmission member 840 is supported rotatably to the spool shaft 401.

Alternatively, a thin flexible lip, instead of the sealing members 10 and 101 in the first through third embodiments, may integrally be provided for sealing at one or both of the cover 9 or 90 and the transmission member 84 or 840. In this embodiment, the member provided with the lip is preferably formed of synthetic resin.

FIG. 4 shows a fourth embodiment of the fishing reel of the invention, in which a drag mechanism 600 is disposed around a driving shaft 830 and a cover 901 covers drag mechanism 600 and the sealing means to seal an inner space S4 bounded by cover 901.

In detail, in FIG. 4, a master gear 820 is supported rotatably relative to the driving shaft 830, and a drag disc 621 and an anti-reverse-rotation gear 881 are supported non-rotatably relative to the driving shaft 830. A braking member 611 is mounted onto the master gear 820. A handle 70 is operated to transmit a driving force from the driving shaft 830 to the master gear 820 through the drag mechanism 600 comprising the drag disc 621 and breaking member 611, and from the master gear 820 to a spool 500 through a pinion 811 and a spool shaft 406. The cover 901 covering the drag mechanism 600 is mounted on the driving shaft 830, and a sealing member 105 is provided between the outer periphery of the cover 901 and the inner periphery of a flange at the master gear 820 to thereby seal the inner space S4. An auxiliary sealing member 106 is provided between the master gear 820 and the anti-reverse-rotation gear 881.

Also, clutch means 430 is provided between the master gear 820 and the spool shaft 406, which disengages to allow the spool 500 to freely rotate together with the spool shaft 406.

In detail, the clutch means 430 includes a clutch cylinder 432 provided with a gear 431 engageable with master gear 820 and sleeved axially movably into the spool shaft 406. One lengthwise end of the clutch cylinder 432 and the outer periphery of the spool shaft 406 include engaging portions 433 and 434 respectively, the engaging portion 433 at the clutch cylinder 432 engaging with the engaging portion 434 at the spool shaft 406 to associate the spool shaft 406 with the master gear 820. On the contrary, the engaging portion 433 at the clutch cylinder 432 disengages from engaging portion 434 at the spool shaft 406 to allow the spool 500 to freely rotate together with the spool shaft 406.

Also, in the fourth embodiment, the clutch cylinder 432 is adapted to be axially movable by an operating lever 435 slidably supported to the side frame 1.

Although several embodiments have been described, they are merely exemplary of the invention and are not to be construed as limiting, the invention being defined solely by the appended claims.

What is claimed is:

1. A fishing reel comprising:
   a reel body;
   a spool shaft supported rotatably relative to said reel body;
   a spool having a pair of flanges and supported to said spool shaft;
   a drive mechanism for driving said spool, said drive mechanism including:
   (a) a driving shaft having one axial end supporting a handle;
   (b) a master gear;
   (c) a drag mechanism having a braking member and a drag disc for transmitting a driving force from said driving shaft to said master gear, said drag mechanism being supported to said driving shaft; and
   (d) a clutch means interposed in a driving force transmitting route from said master gear to said spool for allowing said spool to rotate freely with respect to said drag mechanism when said clutch is in an off-operation mode independently of an operation mode of said drag mechanism; and
   means for housing said braking member and said drag disc within a closed, sealed inner space, said housing means including a cover and a sealing means, said cover and said sealing means being being interposed between said driving shaft and said master gear.

2. A fishing reel according to claim 1, wherein said cover is mounted to said driving shaft and said sealing means is interposed between an outer periphery of said cover and an inner periphery of said master gear.

3. A fishing reel according to claim 1, wherein an anti-reverse-rotation gear is supported to said driving shaft such that it is non-rotatable relative to said driving shaft and an auxiliary sealing means is provided between said anti-reverse-rotation gear and said master gear.

* * * * *